July 20, 1943.  A. N. SPANEL  2,324,735
COMPOSITE RUBBER ARTICLE AND METHOD OF PRODUCING THE SAME
Filed Jan. 16, 1941   5 Sheets-Sheet 1

INVENTOR.
BY ABRAHAM N. SPANEL.
ATTORNEYS

July 20, 1943.   A. N. SPANEL   2,324,735
COMPOSITE RUBBER ARTICLE AND METHOD OF PRODUCING THE SAME
Filed Jan. 16, 1941    5 Sheets-Sheet 2

INVENTOR.
ABRAHAM N. SPANEL.
BY
ATTORNEYS

July 20, 1943.  A. N. SPANEL  2,324,735
COMPOSITE RUBBER ARTICLE AND METHOD OF PRODUCING THE SAME
Filed Jan. 16, 1941   5 Sheets-Sheet 3

INVENTOR.
ABRAHAM N. SPANEL.
BY
ATTORNEYS

July 20, 1943.  A. N. SPANEL  2,324,735
COMPOSITE RUBBER ARTICLE AND METHOD OF PRODUCING THE SAME
Filed Jan. 16, 1941  5 Sheets-Sheet 5

INVENTOR.
ABRAHAM N. SPANEL.
BY
his ATTORNEYS

Patented July 20, 1943

2,324,735

UNITED STATES PATENT OFFICE 2,324,735

COMPOSITE RUBBER ARTICLE AND METHOD OF PRODUCING SAME

Abraham N. Spánel, New York, N. Y.

Application January 16, 1941, Serial No. 374,720

15 Claims. (Cl. 18—58)

This invention relates to composite rubber articles and methods of producing same, and more particularly to latex articles comprising one or more layers of cellular porous latex with one or more layers of ordinary latex, and methods of producing same.

According to my invention, I provide composite latex articles, even hollow seamless ones of irregular shapes, comprising one or more layers of foamed latex and one or more layers of ordinary (i. e., substantially impervious) latex, all of the layers being secured one to another to form an integral mass; the articles being made by "building up" the different layers on forms by successively dipping the forms into the different kinds of latex so that there is formed one or more foam-like porous layers and one or more substantially impervious layers, each separately deposited and dried on the form and all of said layers preferably being vulcanized as an integral unit or mass.

That one may better understand the following description of the invention, certain terms used therein will first be explained.

The term "liquid latex" designates any aqueous dispersion of rubber, either natural or synthetic, which may have numerous well known ingredients added to better adapt it for dipping purposes; and "latex" designates a dry substance made therefrom.

The term "liquid latex foam" designates "liquid latex" which has been aerated, as for example by beating, until a frothy mass has been obtained consisting of gaseous bubbles of varying sizes, as desired; and the term "foamed latex" designates a dried deposit made therefrom.

The term "impervious latex" or "latex film" refers to the dried deposit obtained from ordinary or unfoamed "liquid latex," and regardless of whether such layer or film in its final form may have numerous perforations punched therein to render the layer pervious.

One purpose of the present invention is to provide improved rubber products and methods for manufacturing the same, said products containing in part one or more layers of foamed latex composed of a multitude of minute intercommunicating cells such as may allow moisture, gases, or even very finely divided solid particles to pass through the layer.

A further purpose of the invention is to provide a method by which such a porous layer, having an intercommunicating cellular structure, may be incorporated into a product in various manners according to the requirements as desired. For instance, a layer of foamed latex may be either on one or both outer surfaces of the article, or may be so deposited as to constitute an intermediate or inner layer of the finished article.

In addition to retaining advantages of impervious latex, such as a high degree of elasticity and tensile strength, articles made in accordance with the present invention have many advantageous features which were heretofore unobtainable in dipped goods. These features are attributable to the physical characteristics of the foamed latex layer and are of paramount importance when combined in a latex article of apparel or other product designed to be used in direct contact with a person's skin. For example, latex wearing apparel such as girdles, varicose bandages and the like have been subject to much criticism. The common complaints are that they are difficult to adjust and remove because they do not slide freely over the skin surface. Also, that when in direct contact with the skin they produce a cold, clammy feeling. In addition, it is claimed that such articles are uncomfortable because of the quantity of perspiration which soon collects between the garment and the skin.

All of these objectionable features can be eliminated by forming an article in accordance with one of the several modifications of this invention. By employing a deposit of foamed latex in direct contact with the skin of the wearer, there will be no cling or clammy feeling, for the surface will be soft and yielding and will present a feel much like that of chamois. Not only is the outer or surface skin of this deposit extremely soft in texture and pleasing to the touch, but the whole of the foam-deposited layer acts as an air-filled, fine porous sponge which insulates the wearer's body from any exterior cold or heat. In addition to decreasing the degree of friction and thermal conductivity, the porous mass of fine intercommunicating cells allows the skin of the wearer to "breathe" freely and give off moisture which, in turn is absorbed by the sponge-like texture.

The foregoing is merely an example showing some of the advantages to be derived from one modification of the invention. Other modifications having additional features may be variously adapted to many uses, and the relative position of the porous coating with respect to the impervious layer or films in the finished article will be determined by the circumstances or uses to which the article will be subjected.

According to my invention, not only sheet articles but also irregular shaped hollow seamless articles comprising one or more layers of foamed latex and one or more layers of impervious latex may be made readily and inexpensively; even thin foamed latex layers are capable of being made of very uniform thickness.

The numerous modifications to which this invention is directed can best be described and understood by reference to the accompanying drawings in which—

Figure 1:
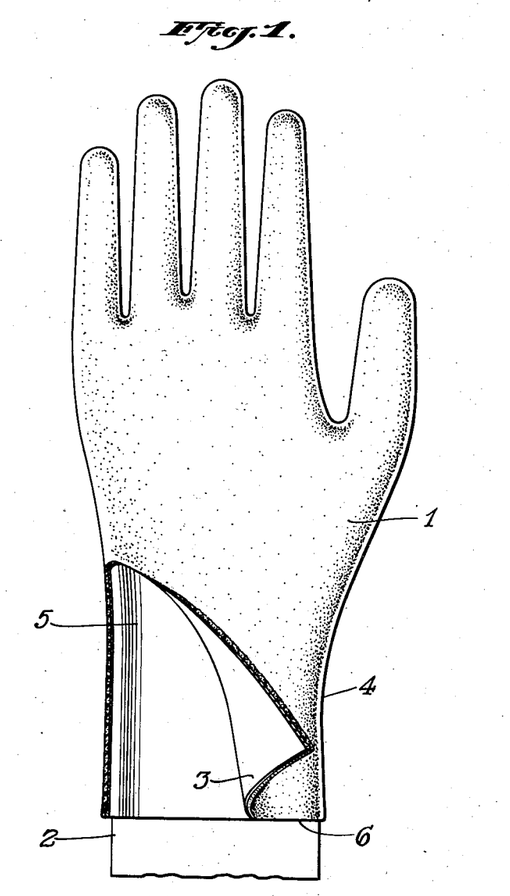
Fig. 1 is a front elevational view of a glove mounted on a form; a portion of the glove being torn away to show its composite structure.

One embodiment of the present invention is represented by Fig. 1 which shows a dipped glove 1, partially torn away but as yet unstripped from the form 2, upon which the glove was deposited. As will be seen from Fig. 1, a film 3 of impervious latex is next to the form and this film is covered on its outer surface with a coating 4 of cellular or foamed latex.

In forming this glove, the form 2, having a smooth article generating surface 5, is first dipped into a bath of ordinary liquid latex, then withdrawn from the bath and allowed to dry. The technique of this dipping and drying process for ordinary latex is well understood by those in the art and, therefore, will not be described in detail. This process is then repeated a number of times until the deposited impervious film 3 has been built up to a sufficient thickness to fulfill the tensile requirements for the glove.

Figure 23:
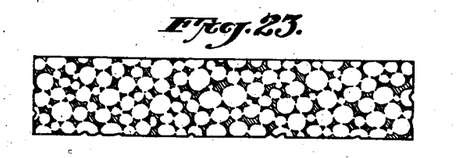
Fig. 23 is a greatly enlarged cross-sectional view showing in detail the intercommunicating cellular structure of a typical foamed latex deposit.

The form with the dry deposit 3 thereon is next dipped into a suitable bath of liquid latex foam which has been beaten up or aerated until the foam has attained the desired density, viscosity and uniformity of bubble sizes. A preferred liquid latex foam for this purpose is described in the copending application of Paul Stamberger, for Process for forming foam rubber and products thereof, filed on even date herewith. A foamed latex deposit typical of that described is shown in Fig. 23, greatly magnified in order that the intercommunicating cellular structure may be clearly seen; but the invention is not to be limited to any particular foamed latex. In dipping into the foam, care should be taken not to immerse the form too quickly, thus causing the entrapment of air about the outer surface of the film 3. After the form has been slowly dipped into the foam bath, it is slowly withdrawn. The rate of withdrawal will depend to a large extent upon the viscosity of the foam bath; but here again care must be exercised, for a too rapid withdrawal will cause the deposited foam to run and produce an uneven coating. The foam deposit is then allowed to dry or become set before being redipped. The thickness of any one deposit of foam will depend among other things, upon the physical characteristics of the particular foam bath and the rate of withdrawal. Therefore, these factors will largely determine the number of dippings necessary to build up the foam coating 4. In some cases, where only a relatively thin porous coating is required, one deposit of foam may suffice. After the final dipping, the film 3, and the coating 4 are vulcanized together upon the form. However, if prevulcanized latexes have been used, it is only necessary to finally dry the deposits before removing the glove from the form. The glove may be finished by trimming or cutting the marginal edge 6, and this may be done either before vulcanizing or removing, or after the glove has been stripped from the form.

A glove made in accordance with the above description will have a smooth glazed impervious surface on one side and a porous surface on the other side, which presents much the feel of chamois or other soft leather. This glove after being removed from the form may be reversed or turned inside out so that the soft porous coating of foamed latex will be in contact with the skin of the wearer when in use. Such a porous coating on the inner surface of the glove will not only allow the body moisture to be absorbed but will overcome the undesirable clammy feeling of ordinary latex or rubber gloves, and will also serve as an insulator to protect the wearer from external heat or cold.

This glove, instead of being turned inside out before use, may be advantageously worn with the cellular coating on the outside, for instance, as a glove to be used for washing dishes. When so used, the foam coating will greatly reduce the likelihood of dishes slipping from the hands of the wearer, as is often the case with ordinary gloves having a glazed surface. Such a glove may also be employed for bath purposes to enable the user to soap himself during the bath or shower, as the case may be. It would be desirable for this purpose to have a relatively thick foamed latex deposit of from one-eithth to one-quarter inch in thickness on the outside, thus enabling the coating to serve as a sponge for soap lather.

If instead of forming a glove having a glazed impervious surface on one side and a relatively rough foam surface on the other, it is desired to make a glove with one surface of smooth foam, the order of dipping may be reversed. In this case the form will first be dipped into a bath of liquid latex foam the required number of times, and then after drying dipped into ordinary liquid latex to form the outer film of impervious rubber. The first deposited coating of foam will have the same smooth surface characteristics as that of the form generating surface 5, upon which it has been deposited; whereas the outer surface of the impervious film, while relatively smooth, will not have a glazed appearance.

The order of dipping just described may be satisfactorily employed if the article being formed does not require reinforcements about the margins thereof. However, many articles, such as surgical gloves, of necessity may be of such limited thickness as to require reinforced margins to prevent ripping. Other articles such as girdles, which, although relatively thick, are subject to a greater degree of pulling or stretching, also need to have reinforced edges. In my U. S. Patents Nos. 1,933,397, 2,015,632 and 2,119,499, for example, I described the manner of forming integrally dipped reinforcements which may be desirably used in conjunction with the present invention. It is therefore necessary to point out that these marginal reinforcements can be best obtained only when the reinforcement generating surface of the form has been first dipped into a bath of ordinary liquid latex, for the liquid latex foam may be too dense or viscous to have the fluid characteristics necessary for generating reinforcements upon these form surfaces.

Figure 2:
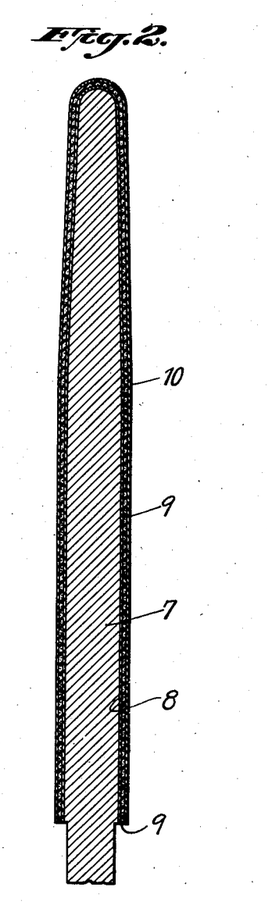
Fig. 2 is a side cross-sectional view of a glove mounted on a similar form showing a modified composite structure.

Another type of glove may be desirable; such as one which not only has an outer impervious surface but also an inner impervious surface, while still retaining a deposit of dried foam therebetween for insulation purposes. Such a glove is shown in Fig. 2 and may be formed by dipping the form 7, first into a bath of ordinary liquid latex a sufficient number of times to build up the impervious film 8, then dipping one or more times into a bath of liquid latex foam to deposit the coating 9, and afterwards redipping the form into the ordinary liquid latex to form the outer impervious film 10. The whole may then be dried and/or cured as previously described. Such an article, while not permitting the absorption of moisture either from the outside or inside surfaces, will have a soft yieldable texture due to the inner coating of foamed latex, and in addition will be very advantageous for winter wear due to the great insulating properties of this inner layer when kept dry. This construction will hereafter be referred to in the specification as a "foam sandwich" construction.

Figure 3:
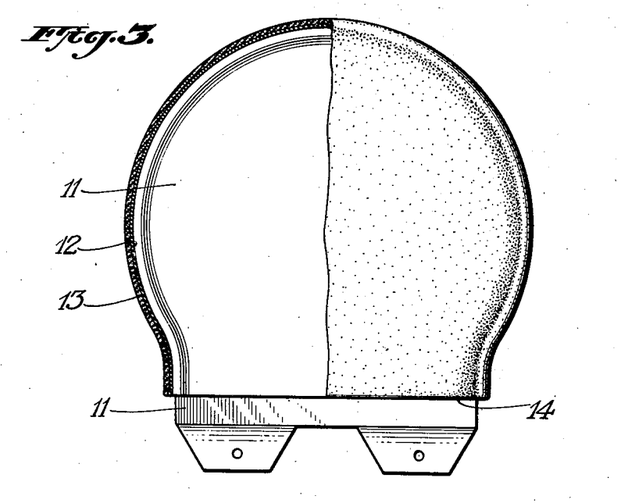
Fig. 3 is a front elevational view of a bathing cap mounted on a form; a portion of the cap being torn away to show its structure.

Another manner in which the invention may be employed is represented by Fig. 3 which shows a bathing cap which has been deposited upon the form 11. In making this cap the form was first dipped into a bath of ordinary liquid latex so that the impervious film 12 was deposited directly upon the generating surface of the form. Afterwards the dried deposited film was coated with the foamed latex 13 by dipping into a bath of liquid latex foam. As previously described, the form should be dipped into the respective baths a sufficient number of times to obtain the required thicknesses for both the impervious film 12, and the porous coating 13. The cap, if desired, may be turned inside out so that the resulting foam lining comes in contact with the forehead of the wearer to prevent the entrance of water through the marginal opening 14 and thus assure keeping the hair dry. When so used, the wearer will experience less difficulty in pulling the foam surface over the hair than when using a cap having a glazed inner surface.

Figure 4:
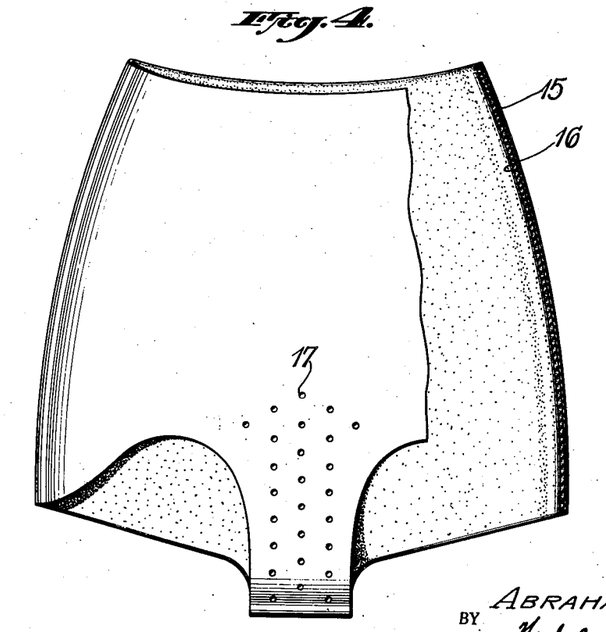
Fig. 4 is a front elevational view of a composite girdle having an inner foam lining.

Fig. 4 shows a girdle which has been formed by dipping upon a suitable form. As will be seen the porous cellular coating 16 forms an inner lining for the impervious film 15. Such a lining has been found very advantageous particularly when applied to girdles, for the surface of the article which is contiguous to the skin of the wearer will not only absorb perspiration, but will also slide over the surface of the skin without undue clinging or pulling. As previously mentioned, it will also serve as an insulation to prevent excessive cold or heat being transferred to the body of the wearer. This girdle may be formed in either of two ways: The impervious film 15 may be deposited directly upon the surface of the form, then the foam coating 16 applied, in which case the garment would have to be turned inside out. Another way of forming the garment is to first apply the foam coating 16 directly to the form, and then to dip into the ordinary liquid latex to form the outer impervious film 15. When so formed it will not be necessary to reverse the garment before wearing, but as previously stated, difficulty may be experienced in forming integrally reinforced margins. Numerous perforations, such as 17 in the crotch portion, may be made throughout the garment either before or after removal from the form. Features of this girdle apart from the present invention are disclosed and claimed in my copending application Ser. No. 342,426, filed June 26, 1940.

Figure 5:
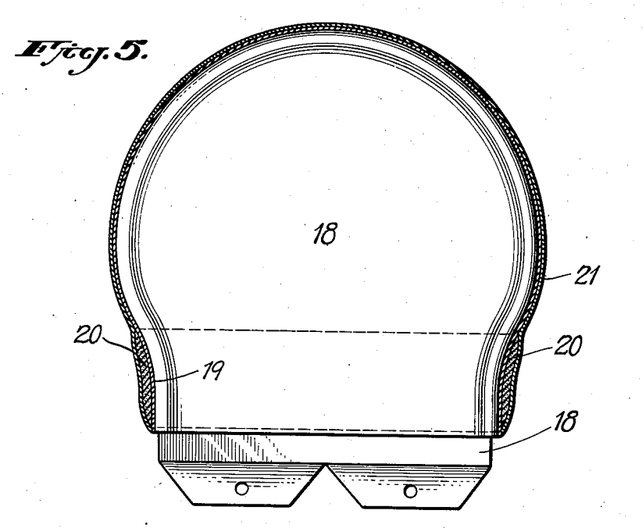
Fig. 5 is a front elevational view showing a bathing cap mounted on a form, the cap being in section to show the composite structure of the lower portion.

Another modification of the invention may be described by referring to Fig. 5 which shows a bathing cap having a forehead band portion comprised of a "foam sandwich" construction. This type of cap may be made by first dipping the form 18 into a bath of ordinary liquid latex to form the film 19, then dipping the form into liquid latex foam to a depth of approximately 2 inches to form a band of cellular latex 20 about the cap opening. The whole is then once more submerged in a bath of ordinary liquid latex to form the impervious film 21. Such a construction is advantageous in that the forehead band portion while relatively thicker than the remainder of the cap is quite soft or spongy and may be readily stretched. In a cap made in accordance with this method, the cellular band may be completely encased by the impervious films and thus protected from any moisture.

Figure 6:
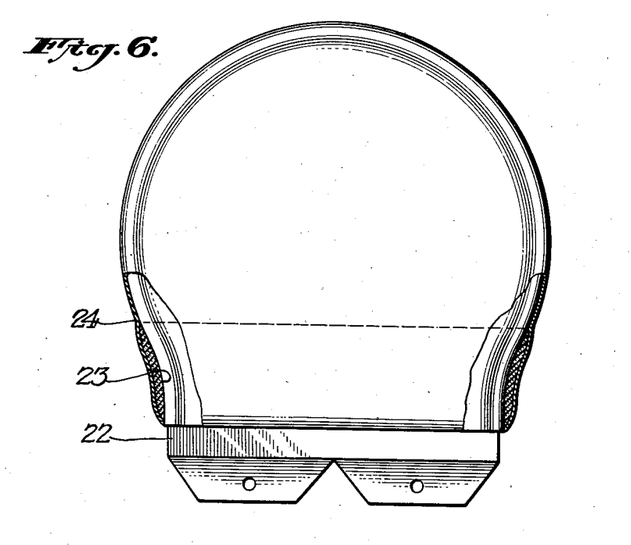
Fig. 6 is also a front elevational view of a bathing cap mounted on a form showing the detail of the lower portion thereof.

Fig. 6 represents still another modification of a bathing cap in which the cellular band portion 23 is in direct contact with the forehead and hair when in use. In this modification the form 22 is first dipped to a depth of approximately 2 inches into a bath of liquid latex foam and dried, then the whole is completely submerged in a bath of ordinary liquid latex to form the film 24.

Figures 7, 8:
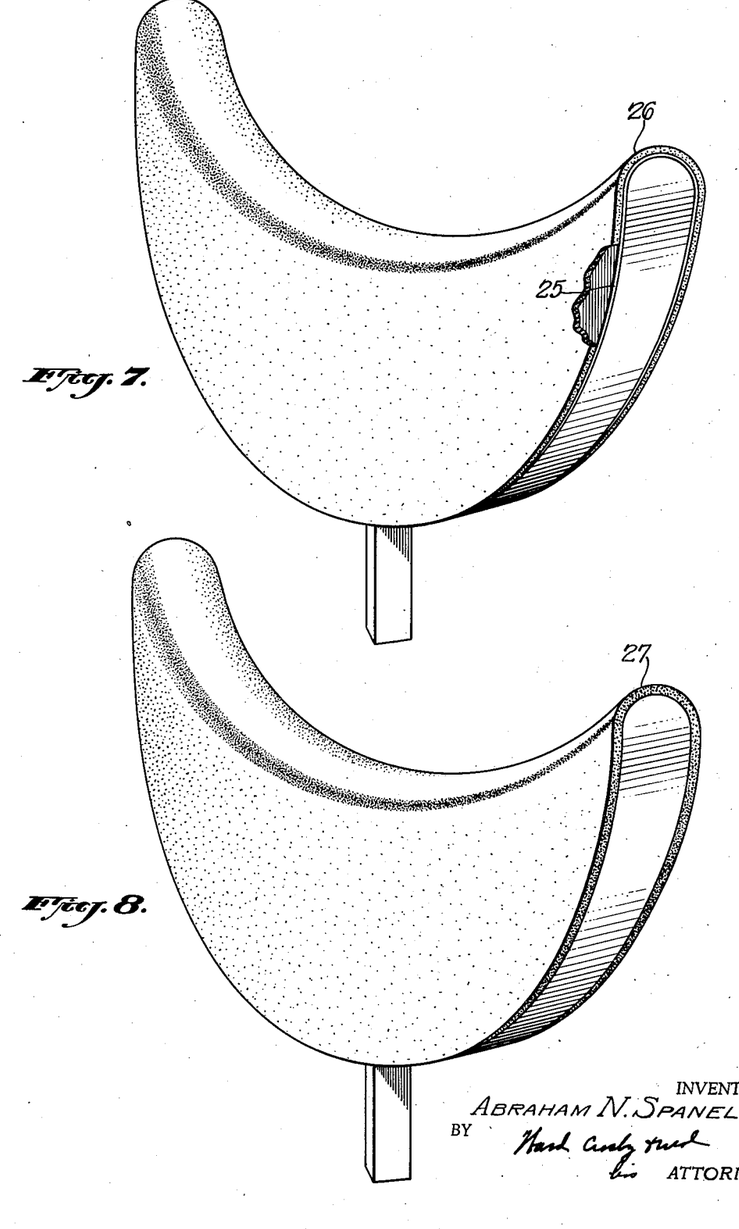
Fig. 7 is a perspective view of a composite dress shield mounted upon a dipping form.
Fig. 8 is also a perspective view of an all-foam dress shield mounted upon a dipping form.

By employing the present invention it has been found possible to make a dress shield which does not require the embodiment of any fabric either for the absorption of moisture, or for a means of stitching the shield to the garment in connection with which it is being used. Such a shield is shown in Fig. 7 in which a suitable form is first dipped into ordinary liquid latex to form the film 25, then dipped into the liquid latex foam to form the relatively thick cellular or foam coating 26. This porous foam coating is capable of absorbing and holding a greater amount of perspiration than the fabrics which have heretofore been employed in the manufacture of dress shields, while the impervious backing film 25 serves to prevent the penetration of perspiration to the garment upon which the shield is attached by sewing or any other means. While the shield is preferably made as described, it is by no means necessary that there be an impervious backing for a shield such as shown in Fig. 8 may be made by dipping the form one or more times into liquid latex foam until a coating 27 of sufficient thickness has been deposited thereon.

Figure 9:
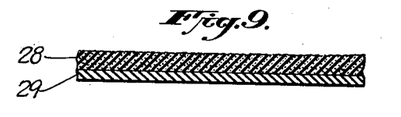
Figs. 9 through 22 are all enlarged cross-sectional views showing various ways in which the impervious and porous deposits may be integrally combined in accordance with this invention.
Figure 10:
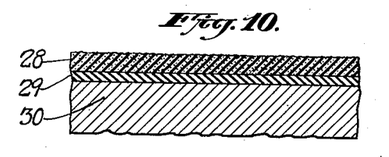

This invention is also very adaptable to the manufacture of composite latex sheet goods having porous, and impervious layers variously combined together. Sheet material, such as that of Fig. 9, in which an impervious backing film 29 is coated with a cellular deposit 28, may be formed as follows: A form having a flat generating surface, a portion of which is shown as 30 of Fig. 10, is dipped into ordinary liquid latex and allowed to dry, then dipped into liquid latex foam to form the porous coating 28. After being dried and/or cured and stripped from the form, it will be found that the surface of the backing 29 is glaze-like, while the porous surface of the coating 28 has a soft chamois feel. Such sheeting may be employed to advantage in hospitals or wherever a patient is confined to bed for long periods of time, for the coating 28, which is soft and yieldable, will not create sheet burns or bed sores upon the body, while the impervious backing 29 will prevent any moisture passing through the sheeting to the mattress.

Figure 11:
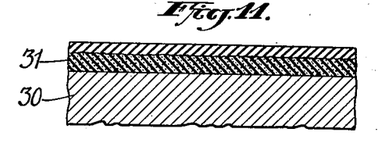
Figure 12:
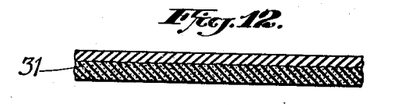

Another manner of making sheet material having one surface porous and the other impervious is represented by Fig. 11, in which a similar form 30 has been first dipped into the liquid latex foam, and then into the ordinary liquid latex. The only difference between sheeting thus made and the sheeting first described may be seen by comparing Fig. 12 and Fig. 9. The sheeting of Fig. 12, in which the foam 31 was deposited directly against the form surface, has a relatively smoother exposed surface than that of the foam coating 28 of Fig. 9.

Figure 13:
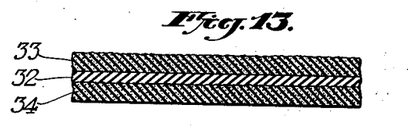
Figure 14:
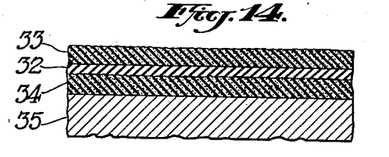

A still further manner of combining porous and impervious deposits of latex is represented by Fig. 13, which shows what will hereafter be referred to as the "film sandwich" construction, in which a film of impervious latex 32 is interposed between two outer coatings of foam latex 33, 34. Such sheeting may be made by dipping the form 35 of Fig. 14, first into a bath of liquid latex foam, then into ordinary liquid latex, and lastly into liquid latex foam.

Figure 15:
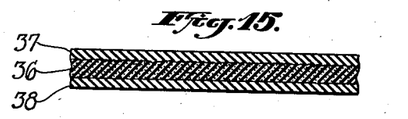
Figure 16:
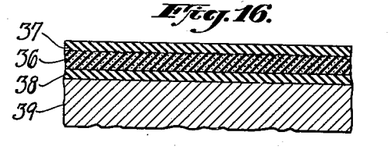

Still another combination of impervious latex and porous latex is shown in Fig. 15, which represents what has been referred to as the "foam sandwich" construction in which a deposit of foam 36 is interposed between two outer impervious films 37, 38. Such sheeting may be made by dipping the form 39 of Fig. 16, first into ordinary liquid latex, then into liquid latex foam, and finally into ordinary liquid latex again.

Figure 17:
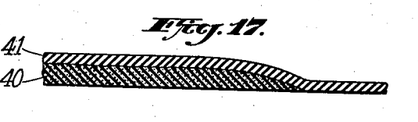
Figure 18:
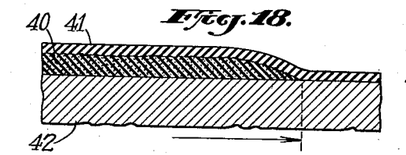

It may sometimes be desirable to have only a portion of an article coated with a porous latex deposit such as, for example, was the case in the bathing cap of Fig. 6. Such a construction is shown in detail by Fig. 17, in which the cellular latex coating 40 extends throughout only a portion of the length of the impervious film 41. This manner of combining the two over a limited area may be best described with reference to Fig. 18, in which the form 42 has been immersed in liquid latex foam up to the dotted line indicated by the arrow. The form was then removed, dried, and dipped to its full extent into a bath of ordinary liquid latex.

Figure 19:
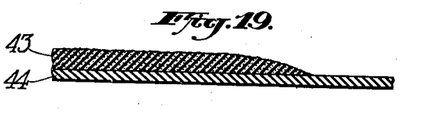
Figure 20:
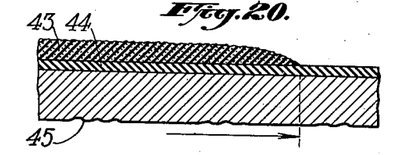

The product of Fig. 19, in which the cellular coating 43 extends only throughout a portion of the area of the impervious film 44, may be made by dipping the form 45 of Fig. 20 first into ordinary liquid latex, and then immersing the form into liquid latex foam only as far as the dotted line indicated by the arrow.

Figure 21:
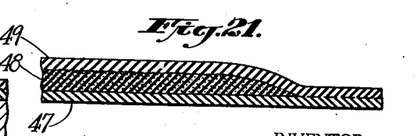
Figure 22:
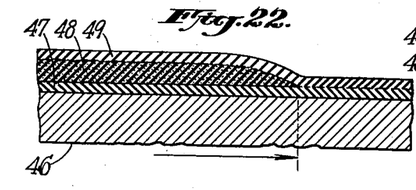

The construction shown in Fig. 21 may be formed similarly to that described in connection with the bathing cap of Fig. 5, namely, the form 46 of Fig. 22 is dipped throughout its entire extent into ordinary liquid latex to form the film 47, then dipped into liquid latex foam only as far as the dotted lines indicated by the arrow to form the porous coating 48, and finally again completely dipped into ordinary liquid latex to form the film 49.

It is also within the contemplation of this invention to employ the well known chemical ionic coagulant dipping method, in which a suitable latex coagulent is used as an aid to the dipping process. For instance, any suitably shaped form may be first coated with a coagulant and then dipped into a bath of either ordinary or foamed liquid latex to form a latex coagulum. The deposits thus obtained will be substantially thicker than those formed without the use of a coagulant, hence by coating with a coagulant between dips, an article of any desired thickness can be obtained by a relatively fewer number of dips. Also, if each coagulum, as it is deposited, is in turn coated with more coagulant, the drying step may be omitted between dippings, if desired.

By the term "finally drying" as used in the appended claims, I mean drying the latex with or without vulcanizing it on the form. By the term "partially drying" the deposited latex after each dipping, I wish to be understood as including the partial solidification of the deposited latex either by heat or by a suitable latex coagulant.

While the invention has been described as particularly applying to water dispersions of latex, both foamed and unfoamed, it is not intended to be thus limited, since it is within the scope of the invention to employ artificial or synthetic dispersions or emulsions of latex both foamed or unfoamed. While it may be preferable to employ conventionally compounded latexes, prevulcanized latexes in their liquid form may be used, and by so doing the final vulcanizing step may be omitted for it will only be necessary to dry the dipped product before stripping from the form.

While the invention has been described according to the preferred embodiments and the manner of carrying out the processes, it will be obvious to those skilled in the art after understanding the invention, that changes and modifications may be made therein without departing from the spirit or scope of the invention, and it is intended in the appended claims to cover all such changes and modifications.

What is claimed as new and desired to be secured by Letters Patent is:

1. The method of forming a dipped latex article having alternate layers of foamed latex and of impervious latex, said method comprising alternately dipping a suitable form into unfoamed liquid latex and into liquid latex foam, the dipping into one of said kinds of latex being either before, after or intermediate the dipping into the other kind of latex, at least partly drying the deposited latex after each dipping and after the last dipping finally drying and removing the article from the form.

2. The method of forming a dipped latex article having alternate layers of foamed latex and of impervious latex, said method comprising alternately dipping a suitable form into unfoamed liquid latex and into liquid latex foam, the dipping into the foamed latex being either before or after the dipping into the unfoamed latex, at least partly drying the deposited latex after each dipping and after the last dipping finally drying and removing the article from the form.

3. The method of forming a dipped latex article having adjacent an end thereof alternate layers of foamed latex and of impervious latex, said method comprising alternately dipping a suitable form into unfoamed liquid latex and into liquid latex foam, the dipping into one of said kinds of latex being either before, after or intermediate the dipping into the other kind of latex, only the lower portion of the form being dipped into the foamed latex, at least partly drying the deposited latex after each dipping and after the last dipping finally drying and removing the article from the form.

4. The method of forming a dipped latex article having one surface of foamed latex and another surface of impervious latex, which comprises dipping a suitable form into a bath of unfoamed liquid latex, removing the form from the bath and at least partially drying the deposit, said dipping and drying being repeated if necessary until an impervious latex film of suitable thickness has been deposited upon the surface of the form, thereafter dipping the form into a bath of liquid latex foam, removing the form from the bath and at least partially drying the foam deposit, said dipping and drying being repeated if necessary until a coating of foamed latex of the desired thickness has been deposited upon the surface of the impervious latex film, then finally drying and removing the article from the form.

5. The method of forming a seamless hollow-shaped latex article having an inner coating of foamed latex and an outer film of imperious latex, which comprises dipping a suitably shaped form one or more times into a bath of unfoamed liquid latex and thereafter one or more times into a bath of liquid latex foam, at least partially drying the deposited latex after each dipping, and after the last dipping finally drying and removing the article from the form and thereafter turning the article inside out so that the impervious film constitutes the outer surface of the article.

6. The method of forming a dipped latex article having a smooth surface of foamed latex on one side and a surface of impervious latex on the other side, which comprises dipping a suitably shaped form having a smooth article-generating surface one or more times into a liquid latex foam, and thereafter one or more times into unfoamed liquid latex, at least partly drying the deposited latex after each dipping and after the last dipping finally drying and removing the article from the form.

7. The method of forming a seamless hollow-shaped latex article having an inner film of impervious latex and an outer coating of foamed latex having a pervious but smooth surface, which comprises dipping a suitably shaped form having a smooth article-generating surface one or more times into a bath of liquid latex foam, and thereafter one or more times into a bath of unfoamed liquid latex, at least partially drying the deposited latex after each dipping and after the last dipping finally drying and removing the article from the form, and thereafter turning the article inside out so that the surface of the foam coating which was deposited directly upon the smooth form constitutes the outer surface of the article.

8. The method of forming a dipped latex article having a coating of foamed latex on the surfaces thereof and an intermediate film of impervious latex therebetween, which comprises dipping a suitably shaped form one or more times into a bath of liquid latex foam, and at least partially drying the deposited foamed latex after each dipping to form a coating of foamed latex, then dipping the coated form one or more times into a bath of unfoamed liquid latex and at least partially drying the deposited unfoamed latex after each dipping to form a film of impervious latex, then once more dipping the coated form one or more times into a bath of liquid latex foam and at least partially drying the deposited foamed latex after each dipping to form an outer coating of foamed latex and then finally drying and removing the article from the form.

9. The method of forming a dipped composite latex article having an impervious film of latex on the surfaces thereof and an intermedite layer of foamed latex, which comprises dipping a suitably shaped form one or more times into a bath of unfoamed liquid latex and at least partially drying the deposited unfoamed latex after each dipping to form a film of impervious latex, then dipping the coated form one or more times into a bath of liquid latex foam and at least partially drying the deposited foamed latex after each dipping to form a coating of foamed latex, then once more dipping the coated form one or more times into a bath of unfoamed liquid latex and at least partially drying the deposited unfoamed latex after each dipping to form a film of impervious latex and then finally drying and removing the article from the form.

10. A vulcanized composite latex product formed by dipping and having a thickness of impervious latex and thickness of foamed latex, integrally combined.

11. A hollow-shaped vulcanized seamless composite latex product formed by dipping and having a thickness of impervious latex and a thickness of foamed latex, integrally combined.

12. A hollow-shaped vulcanized seamless composite latex product formed by dipping and having alternate thicknesses of impervious latex and of foamed latex, a thickness of the impervious latex having an integrally formed reinforcing edge portion and all of said thicknesses being integrally combined.

13. A vulcanized seamless composite latex product formed by dipping and having alternate thicknesses of impervious latex and of foamed latex, all of said thicknesses being integrally combined and vulcanized together.

14. A hollow-shaped vulcanized composite latex product formed by dipping and having alternate thicknesses of impervious latex and of foamed latex, a thickness of the foamed latex being at one surface and a thickness of the impervious latex being at the other surface, said article being reversibly constructed so that for use either the impervious surface or the foamed surface may constitute the outer surface of the article.

15. A vulcanized latex product formed by dipping and having a portion thereof consisting of a thickness of impervious latex and another portion comprising alternate thicknesses of foamed latex and of impervious latex, all of said thicknesses being integrally combined.

ABRAHAM N. SPÁNEL.

DISCLAIMER 2,324,735.—*Abraham N. Spánel*, New York, N. Y. COMPOSITE RUBBER ARTICLE AND METHOD OF PRODUCING SAME. Patent dated July 20, 1943. Disclaimer filed February 10, 1945, by the inventor.

Hereby enters this disclaimer to such parts of said patent which he does not choose to claim or hold, viz:

(a) All products set forth in the specification and claims of the pateint, except said products as embodying a thickness of the vulcanized foamed latex in the form of a porous spongy mass of minute interconnecting cells.

(b) All methods set forth in the specification and claims of the patent, except said methods wherein a layer of the foamed latex upon the drying thereof, remains in the form of a porous spongy mass of minute interconnecting cells.

[*Official Gazette March 13, 1945.*]